(12) United States Patent
Yagnik

(10) Patent No.: US 7,827,123 B1
(45) Date of Patent: Nov. 2, 2010

(54) GRAPH BASED SAMPLING

(75) Inventor: Jay Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 652 days.

(21) Appl. No.: 11/840,139

(22) Filed: Aug. 16, 2007

(51) Int. Cl.
*G06F 15/18* (2006.01)

(52) U.S. Cl. ...................................... 706/12

(58) Field of Classification Search ............... 706/12, 706/20
See application file for complete search history.

(56) References Cited

U.S. PATENT DOCUMENTS 6,584,456 B1 * 6/2003 Dom et al. .................. 706/45
7,421,114 B1 * 9/2008 Brandt ....................... 382/159

* cited by examiner

*Primary Examiner*—Donald Sparks
*Assistant Examiner*—Vincent M Gonzales
(74) *Attorney, Agent, or Firm*—Fenwick & West LLP

(57) ABSTRACT

An iterative method of sampling real world event data to generate a subset of data that is used for training a classifier. Graph Based Sampling uses an iterative process of evaluating and adding randomly selected event data sets to a training data set. In Graph Based Sampling, at each iteration, a two event data sets are randomly selected from a stored plurality of event data sets. A proximity function is used to generate a correlation or similarity value between each of these randomly selected real world event data sets, and the current training data set. One of the randomly selected event data sets is then added to the training data set based on the proximity value. This process of selection and addition is repeated until the subset of training set is a pre-determined size.

38 Claims, 11 Drawing Sheets

GRAPH BASED SAMPLING

TECHNICAL FIELD

The disclosed embodiments relate to the area of machine learning. Specifically, the disclosed embodiments relate to the use of graph based sampling to select training sets for machine learning applications.

BACKGROUND OF THE INVENTION

Classifiers are statistical models, typically implemented as computer programs executed on computer systems, used to classify real world events based on a set of features of a real world event. A real world event is an instance of any entity or event in the real world. An instance of a person and an instance of a hockey game are both real world events. However, real world events can be works of imagination, such as book of fiction, a fake news story, an abstract painting, or a computer-generated digital image. Each of these events are still instances of their respective types.

An event has various features, which can be attributes or elements of the event. An attribute is a numerical or qualitative aspect of the event, for example, a digital image can have attributes such as a color histogram, an average luminance, a texture parameter, or the like. An element refers to a sub-part of the event that can take a value; for example an inning of a baseball game is a distinct sub-part of the baseball game that takes a value of a score. The segmentation of video data provides another example of elements of events. Video data is often segmented into a sequential set of shots or frames, each of which are distinct sub-parts or elements of a video that can take values representing audio, visual and temporal aspects of the shot.

In computational classification, statistical models are generated which reflect the probability that an event belongs to a class based on its set of features. For example, a real world event such as an instance of a flower can be classified as a daisy based on features of the flower such as petal length, number of petals, leaf shape and stem length. To generate these statistical models, classifiers are trained on a set of real world event data with known classes, herein referred to as a training set. A corpus of all real world event data with known classes can be used as a training set to exhaustively train the classifier. In practice, the training set is a selected subset of the corpus of available real world event data.

A large problem in training classifiers is the assumption that the training set is representative of real world data. That is, the training set as a subset of the real world data is representative of the set of all real world events, in terms of having substantially the same types and distribution of features and attributes. If the real world event data is sampled from all possible real world events correctly, the real world event data is assumed to be independent and identically distributed. This condition is called IID.

A classic example used to illustrate the concept of independent identically distributed data is rolling a fair die. For each roll of the die, each outcome is independent of other outcomes (e.g. the probability of rolling a six is the same each time the die is rolled), therefore the distribution is independent. The real world events of rolling the die are identically distributed, that is each outcome (i.e. number) has the same probability of being rolled.

Rolling a die also can be used to illustrate sampling error due to chance. If a goal is to sample the set of all possible outcomes (roll the die) to approximate an identical distribution of the data (an equal number of rolls for each possible outcome), many die rolls would be necessary to approximate an equal numbers for each possible outcome.

In the case of real world events associated with large sets of features, the problem of selecting training set data to approximate identical independently distributed data is complicated by many other factors aside from chance. These factors include over-representation which causes non-identical distribution of data. Using the flower example, a specific breed of daisies may be over-represented in the training data, leading to poor classifier performance. Data may also be skewed due to dependencies between the real world events such as the duplication of data. For example, when training a medical image classifier to identify a specific type of tumor based on cell morphology, multiple pictures of the same tumor may be included in a corpus of images.

The assumption of an independent and identical distribution of the set of features associated with the training set of real world events creates similar bias in training classifiers. Often features are heavily correlated, leading to redundancy in the feature set. For example, if the feature "diagnosis of Alzheimer's disease" is heavily correlated with the feature "age", including both features to train a classifier for classifying medical records can be redundant, and result in the classifier being biased.

The removal of redundant features enhances the capability for generalization of the classification model. If all features in the model as assumed to be independent, then all features are typically assigned an equal weight. Consequently, the inclusion of heavily correlated features leads to over-fitting of the model to the data. Additionally, elimination of redundant features can be necessary for feature sets which are too large to process efficiently. A common method of attempting to compensate for error due to training data that is not identically and independently distributed (non-IID data) is to evaluate the accuracy of a classifier by inputting several random of subsets of training data and evaluating the classifier's classification output of these subsets with respect to real world event data with known classes. This technique is called cross-validation. Cross-validation of non-IID data does not to compensate or correct for non-IID data because random sampling or partitioning of skewed data simply results in a subset of skewed data. Therefore, these methods of cross-validation only serve to evaluate the performance distribution of a classification model based on best and worst sets of randomly sampled data.

SUMMARY OF INVENTION

The described embodiments of the present invention provide a method, system and computer program product that provide the selection of a training data set from a plurality of sets of stored real-world event data for training at least one computer-implemented classifier so that the selected training data set has a distribution approximating an independent identical distribution representative of a real-world distribution.

In one aspect, the present invention provides a computer-implemented method of selecting a training data set from a plurality of sets of stored real-world event data for training at least one computer-implemented classifier, the selected training data set having a distribution approximating an independent identical distribution representative of a real-world distribution. Initially, at least a first set of event data is selected as the training data set. A first set of event data and second set of event data are randomly selected. Proximity values are generated for the first and second sets with respect to training data set. One of the first or second sets of event data is selectively added to the training data set based on the respective proximity values. The training data set for use in training the at least one classifier is then stored. The steps of selecting sets of event data, generating proximity values for the set of event data, selectively adding one set of event data and storing the training data set are repeated until a criteria for selecting the training data set is satisfied.

In another aspect, the described embodiments of the present invention provide a system for selecting a training data set from a plurality of sets of stored real-world event data for training at least one computer-implemented classifier, the selected training data set having a distribution approximating an independent identical distribution representative of a real-world distribution. The system comprises an event database comprising a plurality of stored event data sets and a selection module in communication with the event database. The selection module is adapted to select at least a first set of event data as the training data set. The selection module is further adapted to randomly select a first set of event data and a second set of event data. The selection module is adapted to generate for the first and second sets of event data respective proximity values with respect to training data set. The selection module is adapted to selectively add one of the first or second sets of event data to add to the training data set based on the respective proximity values and store the set training data set. The selection module is further adapted to repeat the steps of randomly selecting, generating proximity values for and selectively adding event data sets until one or more criteria for selecting the training data set is satisfied.

In another aspect, the present invention may be embodied as a computer-readable storage medium on which is encoded computer program code for selecting a training data set from a plurality of sets of stored real-world event data, according to the above described method.

The features and advantages described in this summary and the following detailed description are not all-inclusive. Many additional features and advantages will be apparent to one of ordinary skill in the art in view of the drawings, specification, and claims hereof.

The figures depict various embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE DRAWINGS

Figure 1:
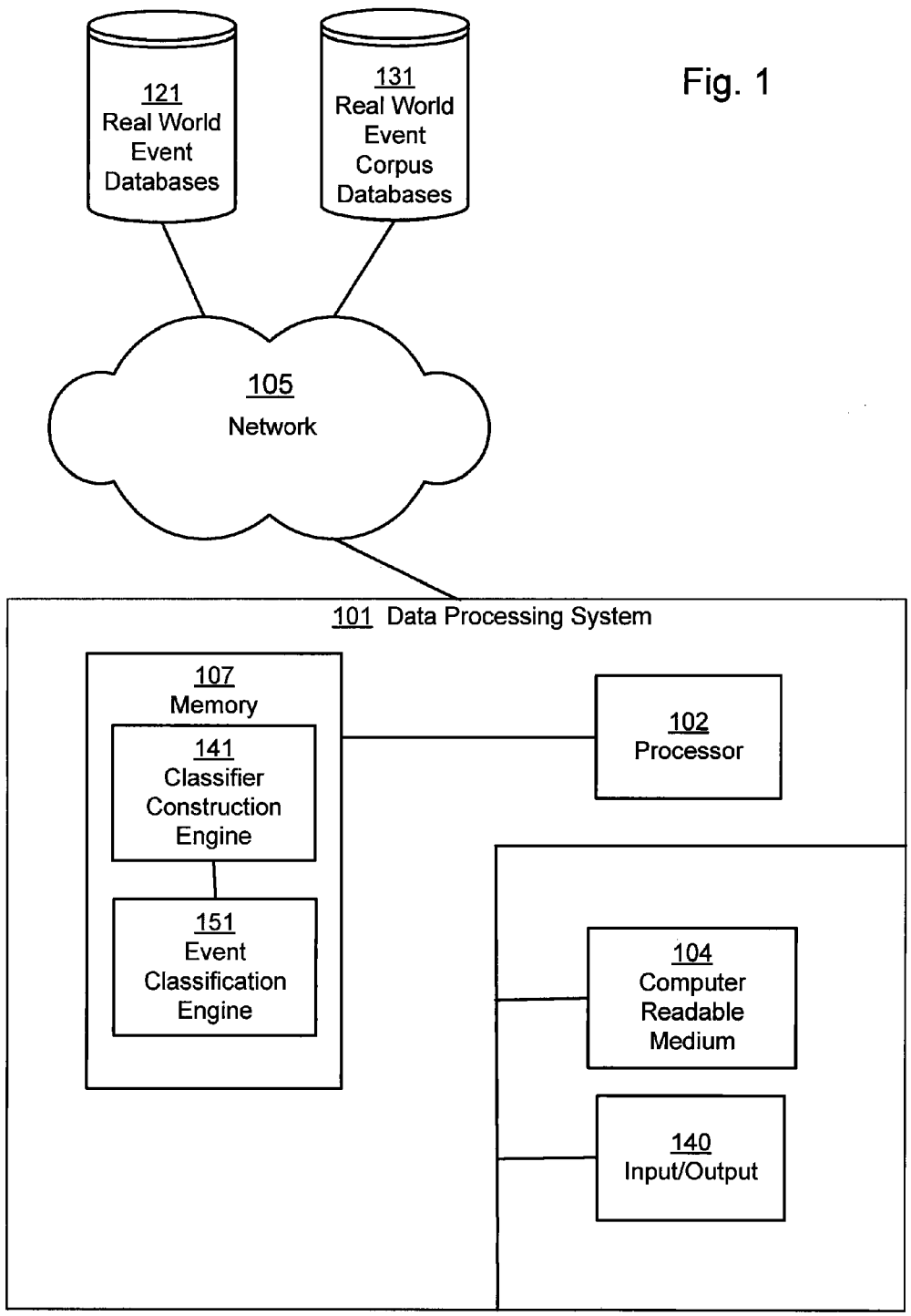
FIG. 1 shows a system architecture for a classification system.

FIG. 1 shows a system architecture 100 adapted to support one embodiment. FIG. 1 shows components used to select training sets to classifier construction, generate classifiers and classify real world event data. The system architecture 100 includes a network 105, through which Event Databases 131 and Event Corpus Databases 141 are accessed by a data processing system 101.

FIG. 1 shows component engines used to generate and apply classifiers to event data. The data processing system 101 includes a Classification Construction Engine 141 and an Event Classifier Engine 151. Each of the foregoing are implemented, in one embodiment, as software modules (or programs) executed by processor 102.

The Classifier Construction Engine 141 operates to select training sets of real world event data, training sets of feature data and generate classifiers, based on the selected training sets. The Classifier Construction Engine 141 further operates to generate scores representative of the accuracy of a classification model by generating a plurality of classifiers according to the classification model. The Classifier Construction Engine 141 is adapted to communicate with Event Corpus Databases 131 through the network 105.

The Event Classifier Engine 151 operates to classify sets of event data. The Event Classifier 151 is adapted to communicate with the Classifier Construction Engine 141 to receive classifiers. The Event Classifier Engine 151 is also adapted to communicate with the Event Databases 131.

According to the embodiment of the present invention, the Classifier Construction Engine 141 and the Event Classifier Engine 151 can operate on the sets of event data in different orders than described above.

It should also be appreciated that in practice at least some of the components of the data processing system 101 will be distributed over multiple computers, communicating over a network. For example, either or both the Event Classifier Engine 151 and the Classifier Construction Engine 141 may be deployed over multiple computer servers. For convenience of explanation, however, the components of the data processing system 101 are discussed as though they were implemented on a single computer.

In another embodiment, some or all of the Event Corpus Databases 131 and the Event Databases 121 are located on the data processing system 101 instead of being coupled to the data processing system 101 by a network 105. For example, the Event Classifier Engine 151 may classify sets of event data from Event Databases 121 that are a part of or associated with the data processing system 101.

FIG. 1 shows that the data processing system 101 includes a memory 107 and one or more processors 102. The memory 107 includes the Event Classifier Engine 151 and the Classifier Construction Engine 141 each of which is preferably implemented as instructions stored in memory 107 and executable by the processor 102.

FIG. 1 also includes a computer readable storage medium 104, which can also be used for storing, for example, at least one of the Event Classifier Engine 151 and the Classifier Construction Engine 141. FIG. 1 also includes one or more input/output devices 140 that allow data to be input and output to and from the data processing system 101. It will be understood that embodiments of the data processing system 101 also include standard software and hardware components such as operating systems and the like and further include standard hardware components (e.g, network interfaces, storage devices, etc.) not shown in the figure for clarity of example.

Figure 2A:
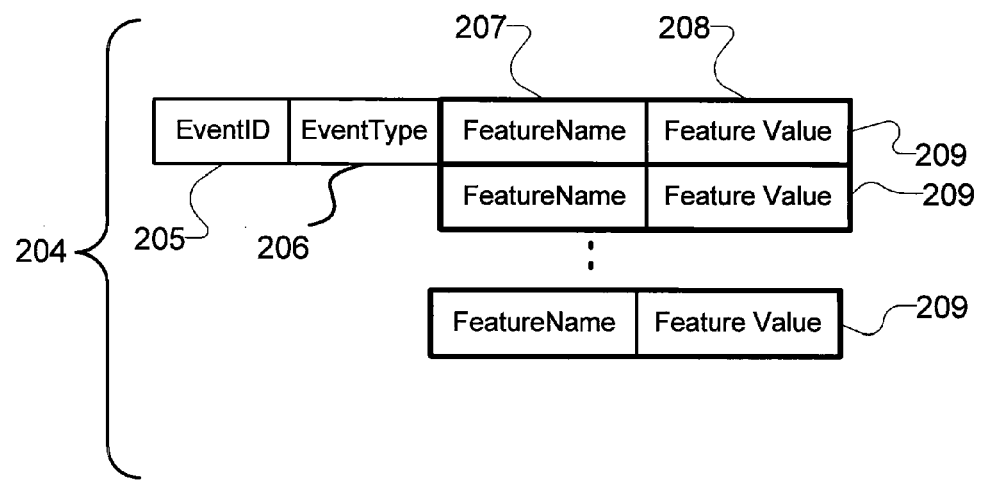
FIG. 2a illustrates the storage of real world event data in an Event Database 121 according to one embodiment.

FIG. 2a illustrates the storage of sets of real world event data in the Event Database 131 according to one embodiment. Each Event 204 is represented by a tuple in an Event Database 121. A tuple 204 comprises an Event ID 205, Event Type 206, and a set of one or more Features 209. Each Feature 209 includes a FeatureName 207 and FeatureValue 208. The Event ID 205 can be any kind of unique identifier that uniquely identifies (e.g., as a primary key in the Database 121) an event, such as an alphanumeric string, bit string, or the like, or a combination of data associated with the event into the EventID 205 such as time, name, or other information specific to the event.

Event Type 206 is a categorical variable used to define the type of event. Type of event is a broad category not to be confused with a class of event. The Event Type 206 can represent the type of media of an event, such as text document, picture, video or sound file, or any other useful categorization. According to the embodiment, Event Type 206 is used to define or control the set the features associated with an event.

The Features 209 are the data that represents or describes any qualitative or quantitative attributes, characteristics, or elements associated with an Event 204. For instance, a book (an instance of an event) has non-numerical features like title and author. A book also may have categorical features such as the genre or color. A book also has quantitative features like date of publication, price, number of pages and number of citations. Elements are parts of real world events. For instance, elements of a book are an ordered set of words, chapters, index, and table of contents.

Features 209 can represent raw data associated with an event or they can be pre-processed and combined in any way to create new Features 209. A Feature 209 can be a function of one more many elements of an event. For instance, a set of pixels are the elements of a digital image. However, information about the pixels may be processed to create numerical features, for example, aspect ratio and (number of bright pixels)/(number of dark pixels). Likewise, in video data a set of shots are the sequential elements of a segmented video. Individual shots may be assigned temporal features such as timing offset. Information from individual shots may also be processed to generate features representing visual aspects of each shot such as color histograms, motion vectors and/or the audio aspects such as the MelFrequency Cepstral Coefficient (MFCC) features. Enumerating word frequencies in a text document is another method of deriving features from the elements of an event.

Each Feature 209 associated with an event includes a FeatureName 207 and FeatureValue 208. A FeatureValue 208 is the value stored for a given feature. In embodiments where FeatureName 207 represents a categorical or qualitative feature, the FeatureValue 208 is a text string, such as 'Title". In embodiments where FeatureName 207 represents a numerical value, the FeatureName 207 might be a floating point number or integer.

Figure 2B:
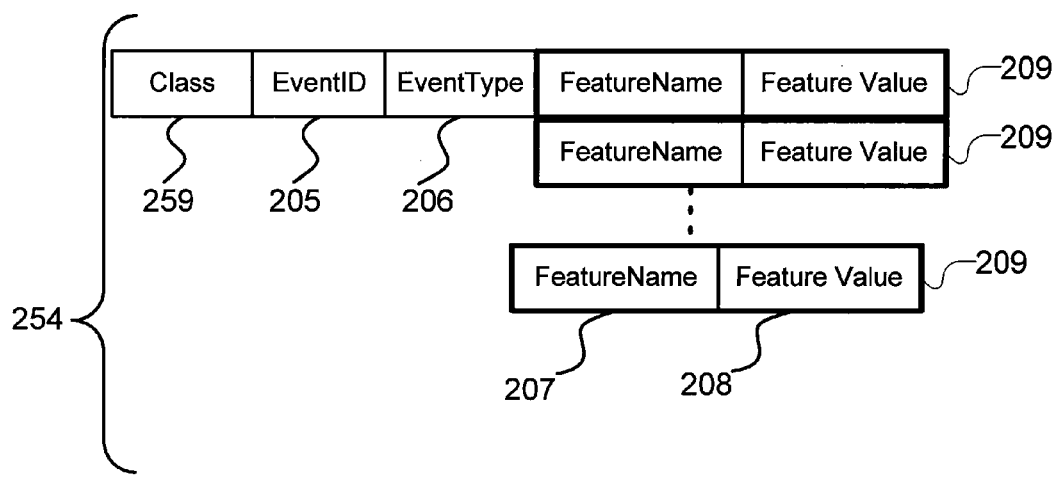
FIG. 2b illustrates the storage of real world event data in an Event Corpus Database 131 according to one embodiment.

FIG. 2b illustrates the storage of real world event data in an Event Corpus Database 131 according to another embodiment. Real world event corpus data comprises Event 254 and Feature 209 data which are further associated with a class or category. Here, a tuple 254 comprises a Class 259, Event ID 205, Event Type 206, and a set of Features 209. A Class 259 is used to represent a class or category of event. A class is defined as any group of real world events having shared characteristics such as features. A category is a type of class that marks a natural division between different types of things.

The Class 259 field may be assigned manually or assigned computationally. Manual curation of a corpus refers to the assignment of classes or categories to events based on human discretion. Computational assignment of classes to events refers to the use of machine learning approaches to generate classification values indicative that an Event 254 belongs to a Class 259. In one embodiment, Class 259 field is assigned by the Event Classification Engine 151.

Figure 3:
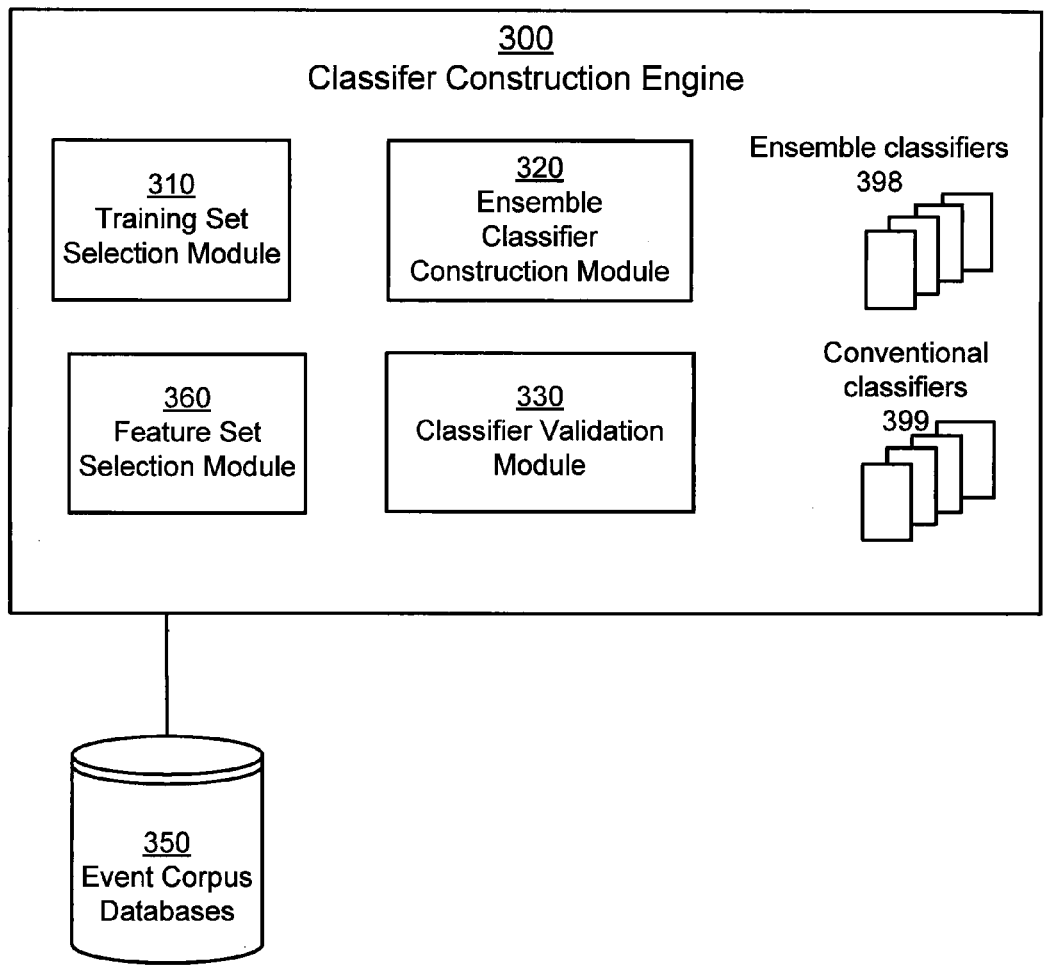
FIG. 3 illustrates one embodiment of a Classifier Construction Engine 300.

FIG. 3 illustrates one embodiment of a Classifier Construction Engine 300. The Classifier Construction Engine 300 is comprised of three modules, a Training Set Selection Module 310, a Feature Set Selection Module 360, an Ensemble Classifier Construction Module 220 and a Classifier Validation Module 330.

The Training Set Selection Module 310 selects subsets of real world Events 254 associated with a Class 259 of Events 254 as training data for classifier construction. The Training Set Selection Module 310 is adapted to receive Classes 259 of events as input. The Training Set Selection Module 310 is adapted to communicate with one or more Event Corpus Databases 350 to select training sets comprised of real world Events 204 of the received Classes 259 of Events 254. The Training Set Selection module is also adapted to receive sets of Features 209 associated with real world Events 254 from the Feature Set Selection Module 360. The Training Set Selection Module 310 uses graph based sampling to select sets of real world Events 254 associated with a Class 259 of Events 254 as training data, as further described below.

The Feature Set Selection Module 360 selects subsets of Features 209 associated with a defined set of real world Events 254 for use as training data for classifier construction. The Feature Set Selection Module 360 is adapted to communicate with one or more Event Corpus Databases 350 to select subsets of Features 209 associated with a defined set of real world Events 254. The Feature Set Selection Module 360 receives a set of defined real world Events 204 as input. Alternatively, the Feature Set Selection Module 360 is adapted to receive a defined set of real world Events 254 from the Training Set Selection Module 310. The Feature Set Selection Module 360 selects subsets of Features 209 associated with a defined set of real world Events 254 such as training data using graph based sampling.

The Ensemble Classifier Construction Module 320 generates Ensemble or consensus classifiers 398 based on selected training sets of data. Ensemble or consensus classifiers 398 refer to computer-implemented classification models that generate a plurality of statistical classification models and combine the predictions of the plurality of statistical classification models. The Ensemble Classifier Construction Module 320 generates Ensemble classifiers 398 according to any consensus classification algorithm including Boosting and Bagging algorithms. Other applications of consensus classification using other classifier algorithms will be apparent to those skilled in the art. The Ensemble 398 classifiers are stored as computer readable files.

The Classifier Validation Module 330 generates conventional or single classifiers 399 based on a conventional or single classification model or algorithm as opposed to Ensemble methods. According to one embodiment, the Classifier Validation Module 330 generates a conventional classifier 399 based on a single training set of data. In other embodiments, the Classifier Validation Module 330 generates a plurality of conventional classifiers 399 based on a plurality of training sets to validate the classification model or algorithm. The conventional classifiers 399 are typically stored as computer readable files.

In one embodiment, the Classifier Validation Module 330 is adapted to receive sets of training data from the Training Set Selection Module 310. The Classifier Validation Module 330 generates a plurality of classifiers using any probabilistic or regression-based classification algorithm including support vector machines (SVMs), neural networks, and Bayesian approaches. Other classification algorithms will be apparent to those skilled in the art. According to one embodiment, the Classifier Validation Module 330 generates multi-class classifiers or binary classifiers.

The Classifier Validation Module 330 further generates scores representative of the accuracy of the classification model by determining a plurality of accuracy values. To do this, the Classifier Validation Module 330 is adapted to receive test sets of real world event data associated with classes of events from the Event Corpus Databases 350. The Classifier Validation Module 330 generates accuracy scores based on the classification results generated from the application of classifiers to test sets of data. Test data sets are sets of Event 254 data with known Classes 259 used to evaluate the accuracy of classifier prediction. The classifiers are applied to the test data sets to generate metrics or classification results. Classification results include the number of false positive classifications of test set data, the number of false negative classifications of test set data, the percentage or accurate classifications or any other quantitative classification result representative of the accuracy of the classifier.

Figure 4:
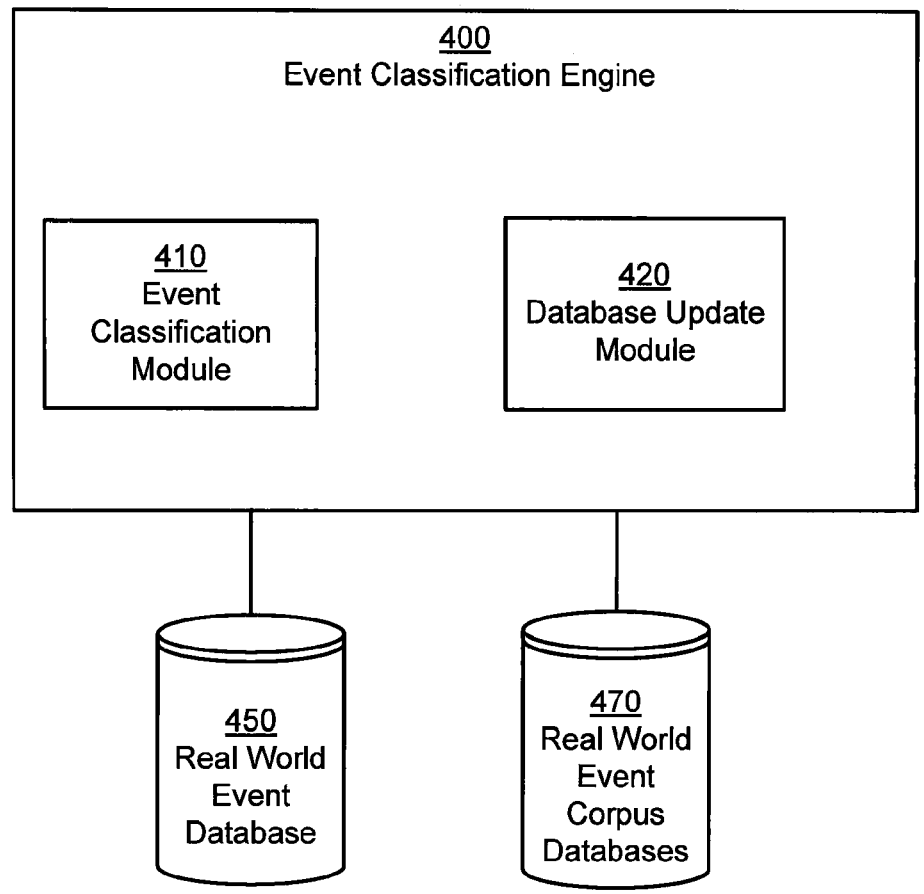
FIG. 4 illustrates one embodiment of an Event Classification Engine 400.

FIG. 4 illustrates one embodiment of an Event Classification Engine 400. The Event Classification Engine 400 has two modules, an Event Classification Module 410 and a Database Update Module 420. The Event Classification Engine 400 is adapted to communicate with the Event Database 450 and the Event Corpus Database 470. The Event Classification Module 420 is further adapted to receive classifiers from the Classifier Construction Engine 400.

The Event Classification Module 410 operates to classify real world event data. The Event Classification Module 410 identifies sets of Event 204 data in the Event Databases 450 based on EventType 206 of the Event 204 data. In some embodiments, both classifiers and Events 204 to be classified by the Event Classification Module 410 are specified based on user input of Classes 259 associated with Events 205 and EventTypes 206.

The Event Classification Module 410 generates a classification value for sets of Event 204 data by applying a classifier 398 to the Events 204. Classification values may be absolute values or probability values. In some embodiments, the Event Classification Module 410 assigns a Class 259 to event data sets based on the classification value exceeding a threshold value.

The Database Update Module 420 operates to update the Corpus Databases 470 based on the Class 259 assigned to the Events 204. In some embodiments, the Database Update Module 420 operates to updates the Event Corpus Databases 470 to include sets of Event 204 data with Class 259 assigned.

Graph Based Sampling

Graph Based Sampling is an iterative method of sampling real world event data from an Event database 131 to create a subset of data that is used for training a classifier, herein referred to as a training data set. A first set of event data from the Event Database 131 is selected as "seed" events to initialize the training data set. Then Graph Based Sampling uses an iterative process of evaluating and adding randomly selected sets of event data from the Event Database 131 to the training data set. In Graph Based Sampling, at each iteration, a two event data sets are randomly selected from the Event Database 131, and a correlation function measures a correlation or similarity value between each of these randomly selected sets of real world event data, and the current training data set. One of the randomly selected event data sets is then added to the training data set based on the proximity value. By "random" it is understood that a pseudo-random number generator or its equivalent may be used.

In some instances, the event data set added can be the event data set with the greatest degree of correlation or similarity to the training data set. The iterative addition of event data sets with correlation to the training data set produces a training set of highly correlated or dependent data. This method is useful for evaluating classifier performance, validating classification models and identifying cliques of data that occur in a set or corpus of event data for a given Class 259.

Although the targeted selection of highly correlated data is useful, the majority of the discussion herein is directed to the complementary application of Graph Based Sampling in which the sets of event data with the least value of correlation are iteratively added to the training data set. This selection method is used to generate a subset of real world event data for classifier training which approximates an independent and identically distribution.

Figure 5A:
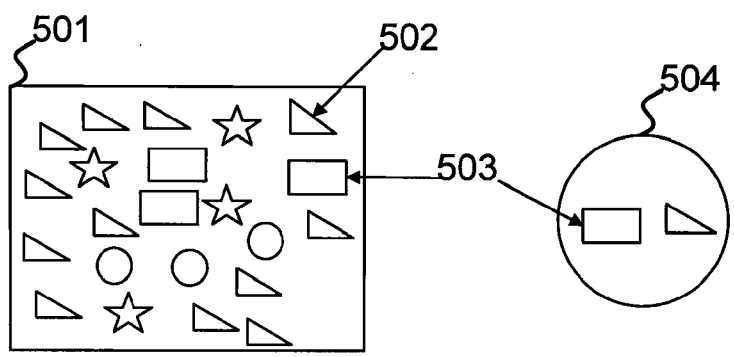
FIGS. 5a, 5b and 5c provide a conceptual illustration of using Graph Based Sampling to select a training data set that approximates an independent and identical distribution.
Figure 5B:
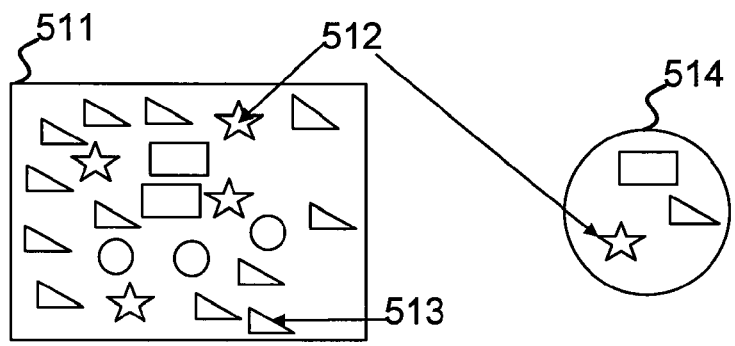
Figure 5C:
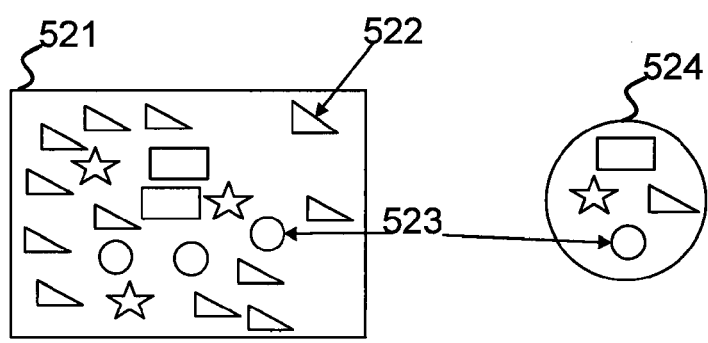

FIGS. 5a, 5b and 5c provide a conceptual illustration of Graph Based Sampling to generate a training data set from sets of event data that approximates an independent and identical distribution. FIGS. 5a, 5b and 5c illustrate the selection of subset of the class shapes for training a classifier which will recognize all things that are shapes. In this example, we assume that the real world probability of any shape occurring is equal and independent of the occurrence of any other shape. This illustration demonstrates the basic approach of Graph Based Sampling, that is, to iteratively select and add data which is the least like the data already selected.

In FIG. 5a, a set 501 of shapes is used to represent a corpus or pool of shape data. The shapes include triangles, stars, and circles. Each shape is represented by an Event 254 (e.g. a "shape event") in the Event Corpus Database 350, and would thus have associated Event ID 205, Event Type 206, and set of Features 209 that represent the shape. In this simple example, the shape events are associated with a single categorical FeatureName 207 such as "ShapeName" which can take the set of FeatureValues 208 from the group {"triangle", "circle", "rectangle", "star"}. Additional Features 209 could include data describing the shape, such as number of sides, a set of numerical coordinates, a digital image, or the like, for each instance in the set of shapes. For purposes of convenience of explanation, we will refer to the "shapes" directly, rather than as "shape events," but it must be remembered that there is underlying stored event data which represents the shape; the Events 204 could equally be called "triangle events" and "circle events" and so forth in order to further appreciate that they represent instances of actual data, not mere abstractions. It should further be appreciated that the use of "shapes" here is merely for the purposes of explanation of Graph Based Sampling, and that in practice the system and method would be applied to classify more meaningful real world events, such as scientific data (e.g., clinical, biological, pharmaceutical, genetic, or medical data), business data (e.g., sales, inventory, purchases, financial, or manufacturing data), social data (e.g., census, demographic, sociographic, psychographic data), as well as data in various forms, such as digital images, digital video, digital audio recordings, and other forms multidimensional data.

Due to sampling error, the distribution of the shapes in the set 501 is not uniform, and there are more triangles (12), than rectangles (3), stars (4) or circles (3). The training data set 504 initially contains a triangle.

As described above, in each iteration of Graph Based Sampling, two sets of event data are randomly selected from a plurality of sets of event data. Thus, in this example, in a first iteration a triangle 502 and a rectangle 503 are randomly selected from the corpus of data 501. As there are a large number of triangles in the set of shapes 501, the likelihood of selecting a triangle at random is greater than for the other shapes (54.5%). A correlation function is used to determine the similarity of each of these selected shapes to the shape (the triangle) already present in the training set 504. Here, the correlation function determines the number (or percentage) of shapes in the training set with the same value of ShapeName (e.g. triangle=triangle) as the randomly selected shapes. Therefore, the triangle 502 has a high degree of correlation (similarity) to the data in the training data set 504 because there is already a triangle in the training data set; in other word there is 100% match between the selected triangle 502 and the triangle in the training data 504. By comparison, the rectangle 503 has a smaller degree of correlation because there are no rectangles in the training data set, that is, there is a 0% match. Therefore, the rectangle 503 is added to the training data set 504 for the next iteration.

FIG. 5b illustrates a second iteration of this method. In the second iteration, random selection results in another triangle 513 and a star 512 being selected. As the star 512, has a smaller degree of similarity or lower proximity value to the shapes already in the training data set (here too a 0% match since there no stars in the training data), as compared to the triangle 513 (correlation of 50%). Accordingly, the star 512 is added to the training data set 514, as shown in FIG. 5b

FIG. 5c illustrates a third iteration. In the third iteration, another triangle 522 and a circle 523 are randomly selected. Since the circle 523 has a lower proximity value (0% match) to the shapes already in the training data set than the triangle 522 (33% match), the circle is added to the training data set 524.

As demonstrated in the three iterations, Graph Based Sampling provides de-correlated training data set 524 which approximates an independent and identical distribution. In other words, the shapes that are iteratively added to training data set are those that are maximally different from the shapes already present in the training set. Accordingly, the use of Graph Based Sampling compensates for sampling error or bias in the corpus of data. In this example, the over-representation of triangles in the event dataset 501 is compensated for by the selection and addition of shapes with the least amount of similarity to the graph.

Real world event data, as discussed herein, can take two alternate forms. In one embodiment, the Training Set Selection Module 310 selects data associated with Events 254 of a given Class 259 of Events 254. Each subset of Event 254 data selected by the Training Set Selection Module 310 contains the set of Features 209 and Feature Values 208 associated with an Event 204 of a specified Class 259 of Events 254.

In some embodiments, the Feature Set Selection Module 360 selects sets of data associated with Features 209. Each subset of Feature 209 data selected by the Feature Set Selection Module 360 contains the set of Feature Values 208 that the Feature 209 takes over a given Class 259 of Events 254 or selected Classes 259 of Events 254.

As can be appreciated from the above example, Graph Based Sampling constructs a training data set representing pair-wise correlations between sets of event data in a dataset and selects a subset of event data approximating an identical and independent distribution of data. Therefore, Graph Based Sampling approximates the accuracy of an explicit construction of a pair-wise graph to evaluate the de-correlation in a dataset and traversal of the graph to select the optimal subset of event data that are independent and identically distributed. Both the explicit construction of a graph and traversal of the graph to identify a subset of data are steps which suffer from combinatorial explosion when presented with a large corpus of data. In contrast, Graph Based Sampling scales linearly with the size of the corpus.

Due to the random selection of nodes from the corpus or pool of data, Graph Based Sampling is a probabilistic method, and as a result, a given set of input data can produce different outputs each time the method performed. The utility of production of different subsets of approximately IID training data is discussed below in the sections titled Ensemble Classifiers and Classifier Cross-Validation.

Feature Set Selection Using Graph Based Sampling

As discussed above, Graph Based Sampling can be used in Feature 209 selection to eliminate redundant or heavily correlated features in a data set. Feature selection can be applied to any kind of classification problem where Events 254 or Event Types 206 are associated with a large set of Features 209 and corresponding Feature Values 208.

Digital images are one Event Type 206 typically associated with large sets of Features 209. Digital images can be images of people, objects, locations, or any other content. Image classification aims to determine a set of Features 209 that are predictive of the Class 259 of digital images for building a classifier. For example, Features 209 associated with images of human faces can be used to predict Classes 259 such as gender, age, or the person the image is of.

The Feature Set Selection Module 360 uses Graph Based Sampling to select a subset of Features 209 associated with Event 254 data. The Feature Set Selection Module 360 is adapted to communicate with the Event Corpus 350 and the Training Set Selection Module 310.

Figure 6:
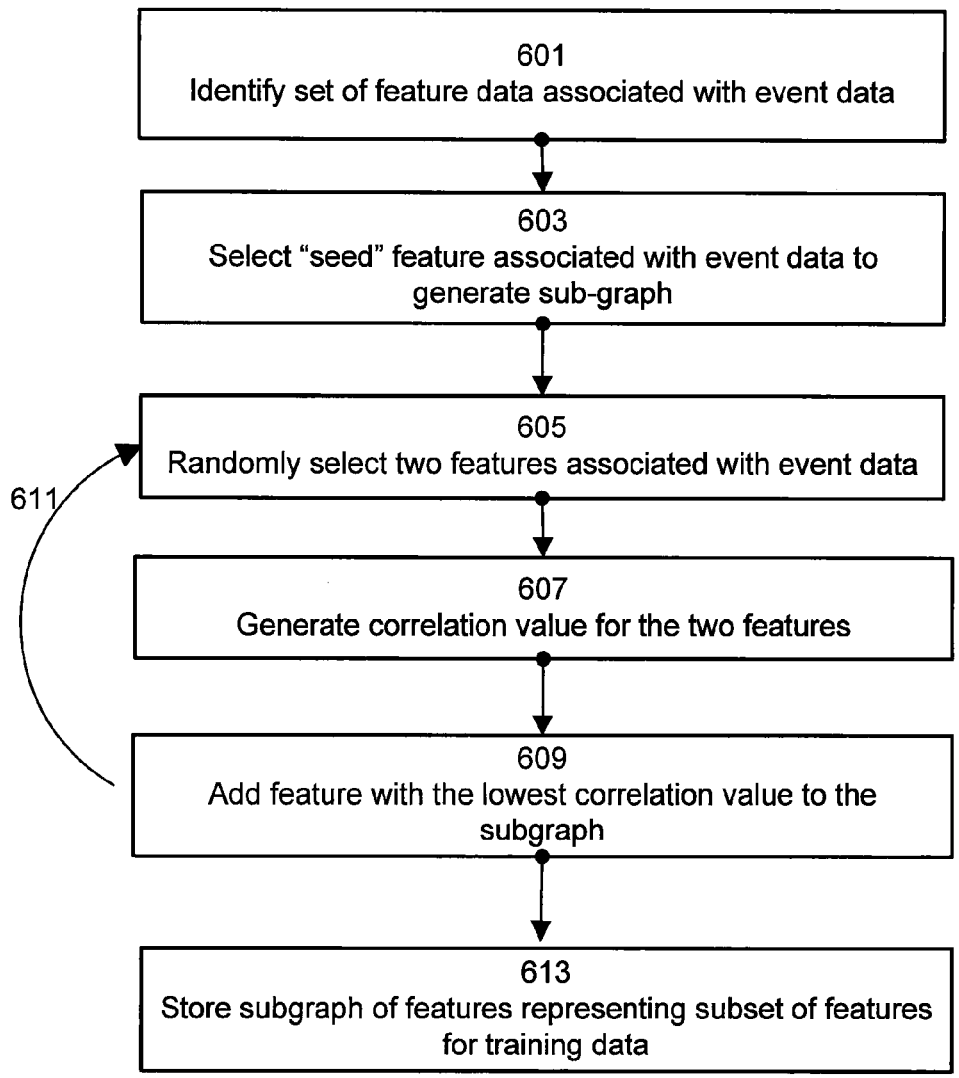
FIG. 6 illustrates a high level workflow for feature set selection according to one embodiment.

FIG. 6 illustrates a high level workflow for feature set selection according to one embodiment. Initially, the Feature Set Selection Module 360 identifies 601 a set of feature data associated with event data of a given class or set of Classes 259. In the above example, the Feature Set Selection Module 360 could identify 601 all Features 209 associated with specified Classes 259 of digital images (such all Features 209 from Events 254 of the Classes 259 'Female' and 'Male') or all classes of digital images (such as all Features 209 from Events 254 with Event Type 206 'Digital Image').

The Feature Set Selection Module 360 selects 603 a set of Feature 209 data associated with a Feature 209, herein referred to as the "seed" Feature 209 data, to generate the training data set. Each subset of Feature 209 data selected by the Feature Set Selection Module 360 contains the set of Feature Values 208 that the Feature 209 takes over the Events 254 associated with the selected Classes 259 or selected Event Types 205. In some embodiments, the seed feature data is selected 603 by randomly selecting one or more Features 209 from the Event Database. In other embodiments the seed feature is pre-defined 603. Continuing the above example, a specific Feature 209 known to provide good classification accuracy such as brightness of an image is selected 603 as a seed Feature 209 to ensure selection of that Feature 209.

The Feature Set Selection Module 360 randomly selects 605 two Features 209 associated with two subsets of Feature 209 data from the identified set of Features 209. For each randomly selected subset of Feature 209 data, the Feature Set Selection Module generates 607 and combines the proximity values between the randomly selected subset of Feature 209 data and the subsets of Feature 209 data associated with the Features 209 already in the training data set.

Proximity values are used to determine the information value of the randomly selected Feature 209. If Features 209 take similar Feature Values 208 over a set of different Events 204, they are non-identically distributed or correlated. If this correlation is due to both Features 209 having the same cause, the Features 209 are dependent. In the example of digital images, two Features 209 can be number of dark pixels and brightness. Since brightness is partially a function of number of dark pixels, these two values are partially correlated. Depending of the Event data 254, including Features 209 and Feature Values 208 for both brightness and number of dark pixels may not add any extra information in classifier generation. Similarly, visual Features 209 such as scalable color or homogenous texture calculated for adjacent sequential segments or frames in a video may also create redundancy in a Feature 209 set used for generating a video classifier. Having redundant or correlated data can also be detrimental because most classification models assume that Features 209 are independent.

Proximity values measure the correlation between different features based on the Feature Values 208 they take over different events. In some embodiments, the Feature Values 208 that a Feature 209 takes over a set of different Events 254 are represented as a vector of Feature Values 208.

The vector of Feature Values 208 for a randomly selected feature is compared to one or more vectors of Feature Values 208 of Features 209 already in the training data set to generate a proximity value. The generation of a proximity value is based on a proximity function. The Feature Set Selection Module 360 can use any type of proximity function to generate a proximity value for the two feature vectors including Pearson correlation or Euclidean distance. The Feature Set Selection Module 360 also uses probabilistic approaches such as joint distribution as proximity functions to generate proximity values.

As Feature Values 208 may not be of the same data type for different types of features (e.g. categorical and numerical), the Feature Set Selection Module 360 normalizes feature values prior to generation of proximity values. For instance, a categorical Feature Value 208 may be encoded as an integer. Numeric Feature Values 208 may be normalized relative to each other or a reference value (e.g. all values can be scaled between 1 and 0) and/or standardized.

In instances in which the training data set contains more than one Feature 209, a single proximity value representing the similarity between the randomly selected Feature 209 and the training data set may be generated by combining many individual proximity values generated by comparing the feature vector for the randomly selected Feature 209 with feature vectors for each of the Features 209 already in the training data set. The term combining is used herein to describe any mathematical function, i.e. adding, subtracting, and averaging, as well as statistical tests for comparing distributions from populations.

The randomly selected Feature 209 with the lowest proximity value is selected for addition 609 to the training data set. The other randomly selected Feature 209 is returned to the set of identified feature data and may be randomly selected again.

The Feature Set Selection Module 350 iteratively performs Graph Based Sampling 611 on the identified set of Feature data 209 until a pre-specified criteria is satisfied. The criteria can be based on any variety of internal factors regarding the training data set, the source data set, or exogenous variables. For example, the criteria can include a specified minimum a size of the training data set, as either a number of Features 209 to include in the training data set or as a percentage of the Features 209 to include in the training data set. In this embodiment, the Feature Set Selection Module 350 performs a number of iterations equal to the specified size.

Alternately, the criteria may be based on an optimal distribution of the training data set. In this embodiment, the Feature Set Selection Module 350 calculates the distribution of the training set data. The Feature Set Selection Module 350 can calculate the distribution of the training set data using any kind of discrete or continuous distribution function. The Feature Set Selection Module 350 determines that the criteria is satisfied based on the calculation one or more metrics describing the distribution such as a metric quantifying a difference between the calculated distribution and a normal distribution. Other appropriate distributions and metrics will be readily apparent to those skilled in the art.

In some embodiments, the criteria is based on the generated proximity values. In one embodiment, at each iteration, the Feature Set Selection Module 350 determines the delta or change in proximity value from the prior iteration. If the proximity values have plateaued, meaning that at least one of proximity values are not demonstrating significant difference between iterations, then the criteria is determined to be satisfied and the training data set is stored. Alternatively, the criteria may be based on threshold proximity value. In this embodiment, the Feature Set Selection Module 350 determines that a criteria is satisfied if after defined number of iterations, no randomly selected Features 209 have generated proximity values under a threshold value.

The method of random selection 605 of Features 209, generation 607 of proximity values for the selected Feature 209, and addition of the randomly selected Feature 209 with the lowest proximity value to the training data set 609 is repeated until the criteria is satisfied 611. The training data set is then stored 613.

Event Data and Proximity Functions

Graph based sampling is also used in to select subsets of training data comprised of Events 254 that approximate an independent and identical distribution. As demonstrated above, the targeted selection of de-correlated Events 254 allows compensates for sets of data where a specific type of event is over-represented.

Figure 7:
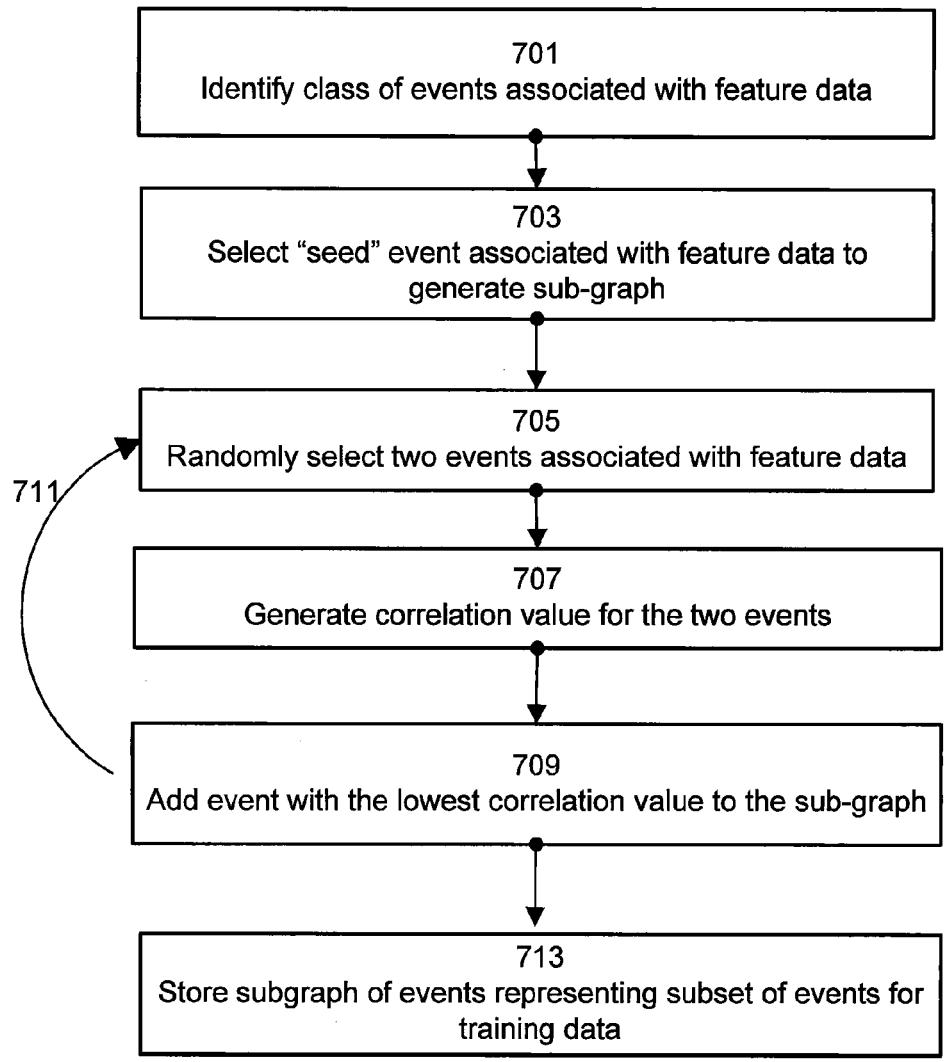
FIG. 7 illustrates a high level workflow for training set selection according to one embodiment.

News stories are one practical example of a type of Event 254 where over-representation of particular content frequently occurs. Electronic news stories (e.g., news stories available from electronic database, such as via the Internet) can be represented with features, such as word frequencies, keywords, and hyperlinks to the source of the story. These features can be used to classify the an electronic news stories as to the type of information it contains based on training classifiers on news stories with known classes such as stories about "politics", "sports", "entertainment", "business and finance", etc. However, in a given class of news stories (e.g. "celebrity gossip") several different news story events may cover the same thing (e.g. Paris Hilton going to jail) causing duplication and over-representation. This duplication within a class causes a classifier to over-fit the classification model to a very narrow set of data (i.e. it only classifies stories about "Paris Hilton" and "jail" as "celebrity gossip", and thus misses other stories). The Training Set Selection Module 310 uses Graph Based Sampling to select a subset of events associated with features and feature values from a given Class 259 of events. The Training Set Selection Module 310 is adapted to communicate with the Event Corpus 350 and the Feature Set Selection Module 360. FIG. 7 illustrates a high level workflow for training set selection according to one embodiment. Initially, the Training Set Selection Module 310 identifies 701 a Class 259 of events associated with feature data. Using the above example of news stories, all news stories with the Class 259 as "technology" and their associated Feature data could be identified.

An Event 254 associated with Feature 209 and Feature Value 208 data, herein referred to as a "seed" Event 254, is selected to generate a training data set 703. In one embodiment, the Training Set Selection Module 310 selects the seed Event 254 at random. In other embodiments, the Training Set Selection Module 310 selects the seed Event 204 based on a defined seed Event 254. For instance, a "technology" news story, such as a news story about Apple Inc.'s iPhone, for which there is a significant amount of coverage and hence redundant news stories may be defined as a seed event. This is useful because the iterative selection of de-correlated or dissimilar news stories based on the features of seed news story will minimize the over-representation of the selected story in the training set.

Two Events 254 associated with Feature 209 data are randomly are selected 705 by the Training Set Selection Module 310 from the remaining class of real world events. The Training Set Selection Module 310 generates 707 proximity values representative of the similarity between each randomly selected Event 254 and one or more Events 254 in the training data set based on a proximity function.

According to the Event Type 205, different types of Features 209 and Feature Value 208 data are be associated with the Event 254. The Training Set Selection Module 310 determines one or many proximity functions for use in generating the proximity values based on the Features 209 and Feature Values 208.

In some embodiments, some or all of the Features 209 associated with the Events 254 are represented as a feature vector of Feature Values 208. The Feature Values 208 can be normalized in any way to ensure Feature Value 208 standardization before applying a proximity function such as correlation. In one embodiment, the Training Set Selection Module 310 normalizes a categorical Feature Value 208 for comparison with numerical Feature Values 208. For example, categorical features such as colors can be represented as integers. In some embodiments, numerical feature values with large ranges of values may be discretized or binned by order of magnitude.

The Training Set Selection Module 310 is adapted to generate 707 proximity values using any kind of proximity function. Examples of suitable proximity functions include but are not limited to Euclidean Distance, Pearson Correlation and Joint Distribution. Other suitable proximity functions will be apparent to those skilled in the art.

For Events 254 associated with sequential Features 209, the Training Set Selection Module 310 can use special proximity functions designed to generate 707 proximity values between sequences of features. The Training Set Selection Module 310 generates 707 proximity values using generic time series proximity functions such as Levenshtein distance and Dynamic Time Warping.

Additionally, the proximity function used by the Training Set Selection Module 310 may be specific to the type of event or sequential data. For instance, if the real world events are associated with time series Feature 209 data such as videos, the Training Set Selection Module 310 generates 707 proximity values based on special proximity function for videos which measure perceptual data such as Minkowski-type distance functions. If the real world events are music files associated with sound Feature 209 data, the Training Set Selection Module 310 generates 707 a proximity value base on a proximity function specific to sound data such as spectral similarity. Also, the Training Set Selection Module 310 generates 707 proximity values for feature data representing biological molecules such as DNA sequences and the protein amino acid sequence compared using sequence alignment algorithms such as Smith-Waterman as proximity functions. Other proximity functions specific to different types of Feature 209 data will be apparent to those skilled in the art.

The Training Set Selection Module 310 generates 707 proximity values between events that have Features 209 that are multi-dimensional such as pixels or atomic coordinates using a number of different proximity functions for this purpose. Examples of proximity functions for multi-dimensional Feature 209 sets associated with Events 254 include but are not limited to convex distance functions or distance functions based on three dimensional co-ordinates.

According to the embodiment, the Training Set Selection Module 310 generates one or more proximity values between the feature sets for each randomly selected Event 254 and the feature sets associated with each Event 254 already in the training data set. The Training Set Selection Module 310 may combine one or more proximity values to generate a single proximity value for real world event.

The randomly selected Event 254 with the lowest proximity value is selected for addition 709 to the training data set. The other randomly selected Event 254 is returned to the set of Events 254 associated with the Class 259 and may be randomly selected again.

The Training Set Selection Module 310 iteratively performs Graph Based Sampling 711 on the identified class of event data until a pre-specified criteria is met. In one embodiment, the criteria may be based on a size of the training data set. Size may be specified as a number of Events 254 to include in the training data set or as a percentage of the Events 254 of a specified Class 259 to include in the training data set. In this embodiment, the Training Set Selection Module 310 performs a number of iterations equal to the specified size.

Alternately, the criteria may be based on an optimal distribution of the training data set. In this embodiment, the Training Set Selection Module 310 calculates the distribution of the training set data. The Training Set Selection Module 310 can calculate the distribution of the training set data using any kind of discrete or continuous distribution function. The Training Selection Module 310 determines the criteria is satisfied based on the calculation one or more metrics describing the distribution, such as a metric quantifying a difference between the calculated distribution and a normal distribution. Other appropriate distributions and metrics will be readily apparent to those skilled in the art.

In some embodiments, the criteria is based on the generated proximity values. In one embodiment, at each iteration, the Training Set Selection Module 310 determines the delta or change in proximity value from the prior iteration. If the proximity values have plateued meaning that at least one two proximity values are not demonstrating significant difference between iterations, then the criteria is satisfied and the training data set is stored. Alternatively, the criteria may be based on threshold proximity value. In this embodiment, the Training Set Selection Module 310 determines that a criteria is satisfied if, after a defined number of iterations, no randomly selected Events 254 have generated proximity values under a threshold value.

The method of random selection 705 of Events 254, generation 707 of proximity values for the selected Events 254, and addition 709 of the randomly selected Event 254 with the lowest proximity value to the training data set is repeated 711 until the training data set is of a pre-determined size. The training data set is then stored 713.

Figure 8:
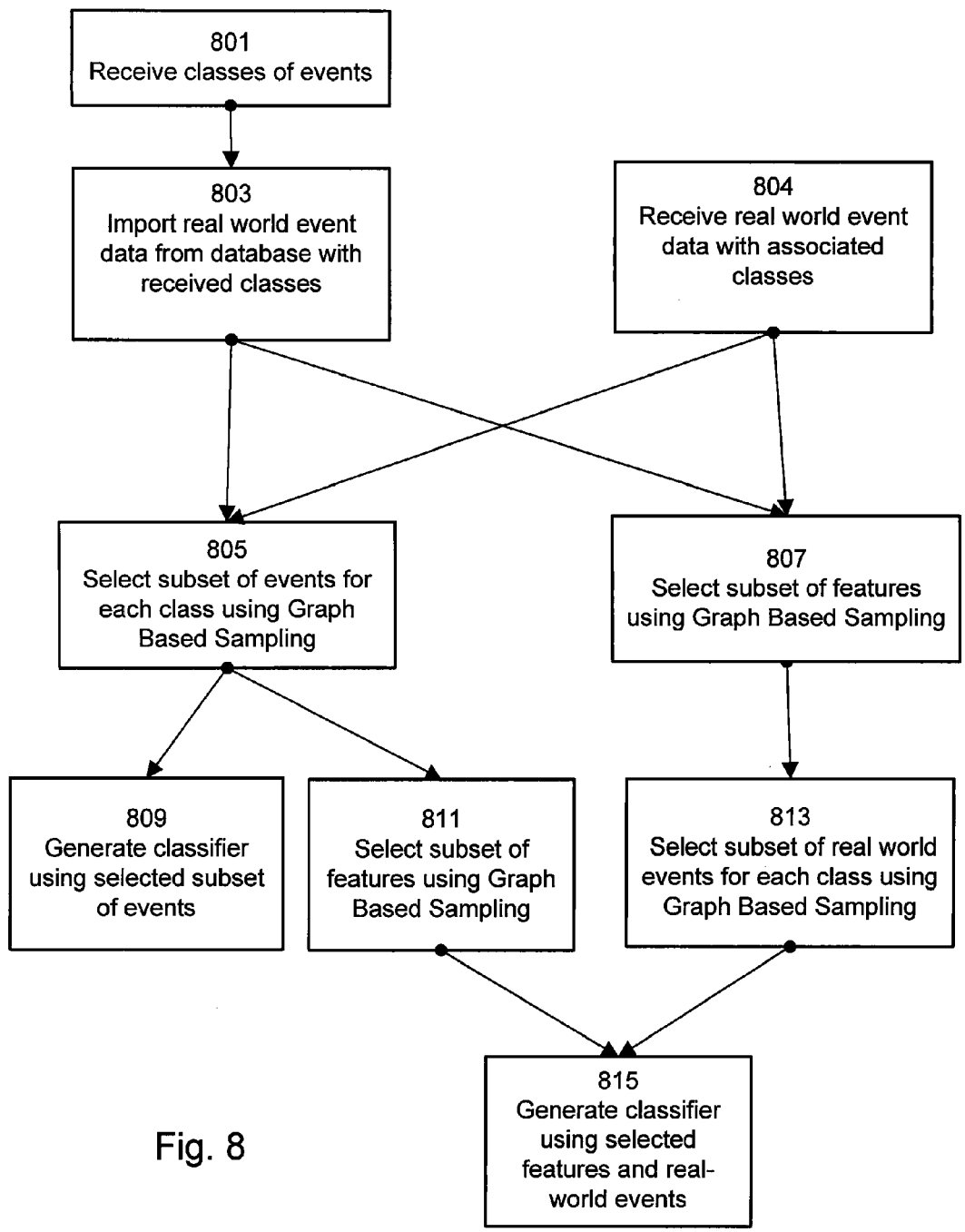
FIG. 8 illustrates two alternate workflows for training set selection.

FIG. 8 illustrates alternate workflows for training set selection. In one embodiment, the Feature Set Selection Module 360 or Training Set Selection Module 310 receives a set of pre-defined Event 254 data associated with a set of classes 804.

In some embodiments, the Feature Set Selection Module 360 or Training Set Selection Module 310 receives 801 a set of Classes 259 representing multiple classes of Events 254. In these embodiments, Events 254 containing the input Classes 259 are imported 803 from the Event Corpus Databases 350.

According to one embodiment, either a subset of Features 209 is selected 807 by the Feature Set Selection Module 360 using Graph Based Sampling or a subset of Events 254 is selected 805 by the Training Set Selection Module 310 using Graph Based Sampling.

In embodiments where feature set selection is not performed, the selected 805 subset of Events 254 a set of Classes 259 of Events 254 are used by the Ensemble Classification Module 320 or Classifier Validation Module 330 to generate 809 a classifier.

In some embodiments, both Feature 209 selection and Event 254 selection are performed using Graph Based Sampling. According to the order of selection in these embodiments, either a subset of Features 209 is selected 811 by the Feature Set Selection Module 360 using Graph Based Sampling or an Events 254 is selected 813 by the Training Set Selection Module 310 using Graph Based Sampling.

The selected 811, 813 subsets of Features 209 and Events 254 are used by the Ensemble Classification Module 320 or the Classifier Validation Module 330 to generate 815 a classifier.

Figure 9:
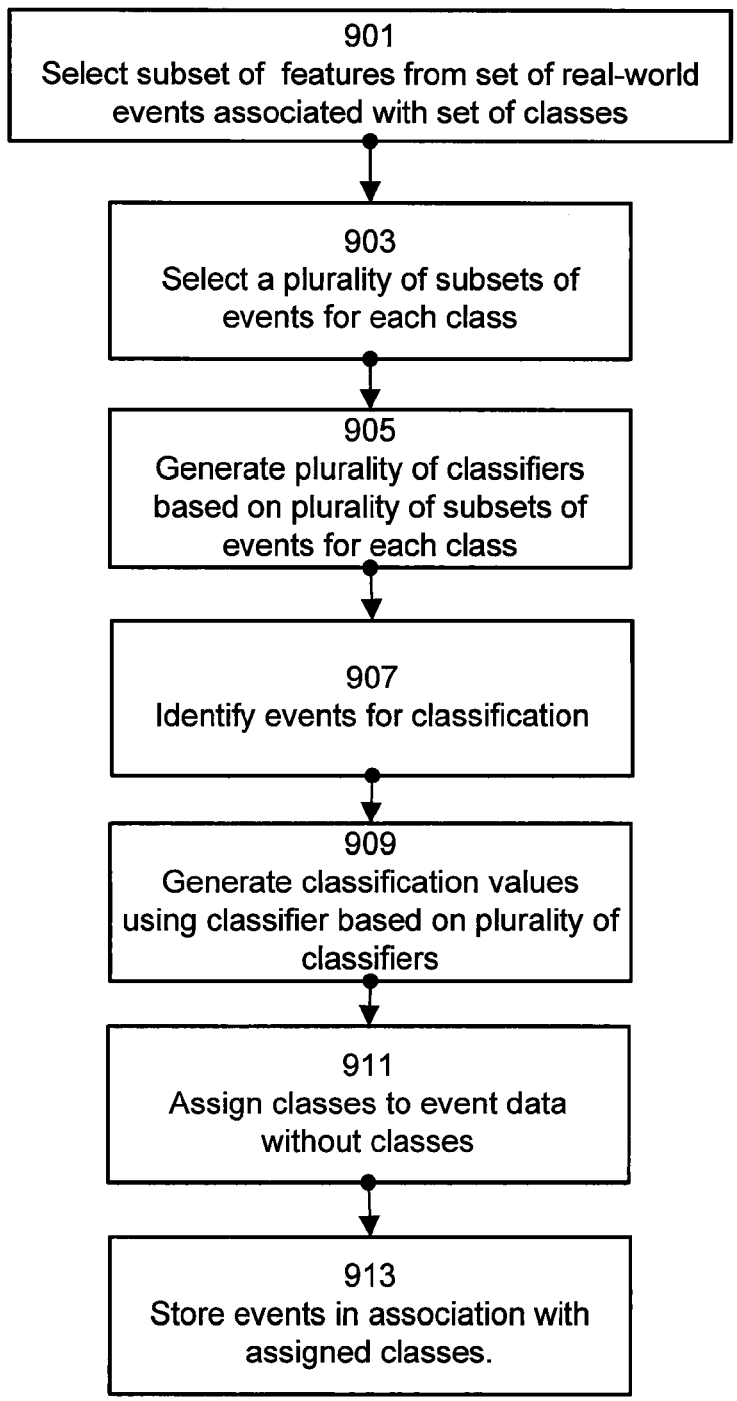
FIG. 9 illustrates a high-level workflow in which Graph Based Sampling is used to generate and apply classifiers to real world event data.

FIG. 9 illustrates a high-level workflow in which Graph Based Sampling is used to generate and apply classifiers to real world event data.

Initially, the Feature Set Selection Module 310 selects 901 a set of Features 209 from a set of Events 254 associated with a defined set of Classes 254. The set of real world events is imported from the Event Corpus Databases 350 based on the set of Classes 259 defined by user input. The set of Classes 259 may be defined as a binary classifier or a multi-class classifier.

In embodiments using a binary classification model, a Class 259 is selected as a positive Class 259 and all events of the same type that are not of that Class 259 are included as a negative class. For instance, in classifying videos, one Class 259 may be 'Car Chase' and the other default class may be all Events 254 with EventType 205 videos that do not have Class 'Car Chase'. In embodiments using a multi-class classification model, many classes may be selected. For instance, several similar Classes 259 with Event Type 205 'Brain Tumors' such as 'Neuroblastoma', 'Glioma' and 'Astrocytoma' may be selected to build an multi-class classifier to classify brain tumors for medical diagnoses based on stored data representing quantitative molecular profiles of tumor samples.

For each individual class, the Training Set Selection Module 310 selects 903 a plurality of subsets of Events 254 for use as training data from the set of real world events associated with the selected subset of features. In the brain tumor example, a plurality of different subsets (e.g. 5) of training data comprising molecular profiles of tumors of known type would be selected for each of the Neuroblastomas, Gliomas and Astrocytomas. The number of subsets of training data may be pre-defined or the Training Set Selection Module 310 may receive a number specifying a number of training sets to produce. The Ensemble Classifier Construction Module 320 generates 905 a plurality of classifiers based on the plurality of subsets of Events 254. According to the embodiments, the plurality of classifiers may be a plurality of sub-classifiers in an Ensemble Classifier or a plurality of classifiers used for classifier cross validation. These steps are discussed in detail with respect to FIG. 10 and FIG. 11 in the sections below titled Ensemble Classifiers and Classifier Cross-Validation. Using the above example, one of the five subsets for each of the three brain tumor types would be selected to create each sub-classifier.

The Event Classification Module 410 generates a classification value based on the applying a generated classifier to Events 204. The Event Classification Module 410 identifies Events 204 in the Event Database 121 that are suitable for classification. In one embodiment, the Classification Module 410 identifies data based on the Event Type 206 of Event 204 data stored in the Event Database 121. The Event Classification Module 410 assigns classes to Events 204 based on generated classification values. In embodiments using binary classifiers, the Event Classification Module 410 generates a probability that an Event 204 is of both the positive and negative classes as classification values. If a classification value is above a threshold classifier value (for instance, if the likelihood of a positive instance is above 95%), then the Event Classification Module 410 assigns a Class 259 to the Event 204. In embodiments using multi-class classifiers, the Event Classification Module 410 generates a probability value that an Event 204 is of multiple classes and assigns a class based on the highest probability value, if the highest probability value is above the threshold probability value then Event Classification Module 410 assigns a Class 259 to the Event 204.

The Database Update Module 420 stores Events 204 in associated with assigned classes. In one embodiment, the Events 204 are stored in the Event Corpus Database 470 with their assigned Classes 259 as a tuple 254.

Ensemble Classifiers

Ensemble or consensus classifiers are defined as models of classification which do not use a single classifier but instead learn a set of several classification models and combine the classification models to generate a classifier value. Ensemble classification algorithms include but are not limited to bagging, boosting, hyperlink ensembles, as well as consensus based probabilistic methods such as randomized decision trees.

A key step in Ensemble or consensus classification is the formation of a diverse set of classifiers from a set of training data. However, without a heuristic to direct selection of data to create diverse classifiers, this diversity may not be captured or it may be captured at the expense of accuracy. Though Ensemble classifiers are often more robust than other classifiers, most Ensemble classification models assume that data entered is independent and identically distributed.

As discussed above, Graph Base Sampling is probabilistic and thus tends to produce different subsets of training data approximating an independent and identical distribution each time training data is selected. Therefore, Graph Based Sampling provides a method to produce several diverse subsets of data without compromising accuracy.

Figure 10:
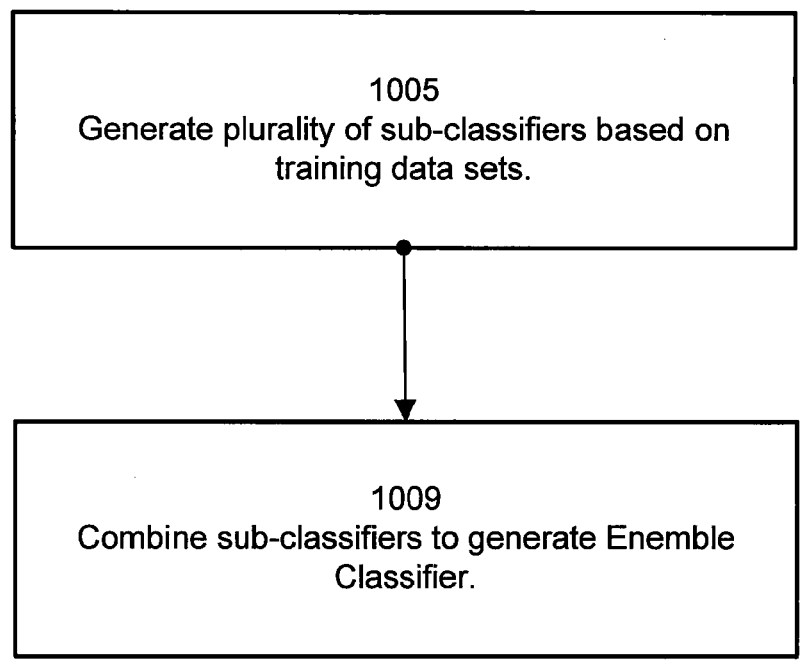
FIG. 10 illustrates the application of Graph Based Sampling to real world event data to generate and apply classifiers to real world event data.

FIG. 10 illustrates the application of Graph Based Sampling to real world event data to generated and apply classifiers to real world event data. In one embodiment, Graph Based Sampling is used to select training data for the generation and application of Ensemble classifiers to unclassified data. The Ensemble Classifier Construction Module 320 generates 1005 a plurality of sub-classifiers based on the plurality of subsets of Events 254. Each sub-classifier in the Ensemble classifier is constructed using one subset of Events 254 representing each specified Class 259. The Ensemble Classifier Construction Module 320 generates 1009 a single Ensemble classifier by combining the plurality of sub-classifiers.

Classifier Cross-Validation

Classifier cross-validation (also called rotation estimation) refers to the use of multiple iterative partitions of data into training data and test data in order to generate and validate classifiers. Classifier cross validation is used to correct for error due to type III error. In Type III error, a hypothesis suggested by the data is assumed to be true without testing other hypotheses. In classification, Type III error occurs when a single classifier is assumed to be accurate without generating and validating other classifiers.

As discussed above, the random selection and partitioning of non-IID data creates training data sets and test data sets with non-IID data. A common method used to compensate for non-IID data in classifier cross-validation is to attempt to exhaustively select all possible training sets in order to evaluate the accuracy of all possible classifiers. The number of possible training sets grows exponentially based on the size of the training set and the set of real world event data the training set is selected from. Therefore, exhaustively partitioning expends a great deal of computational resources and is sometimes not possible.

Figure 11:
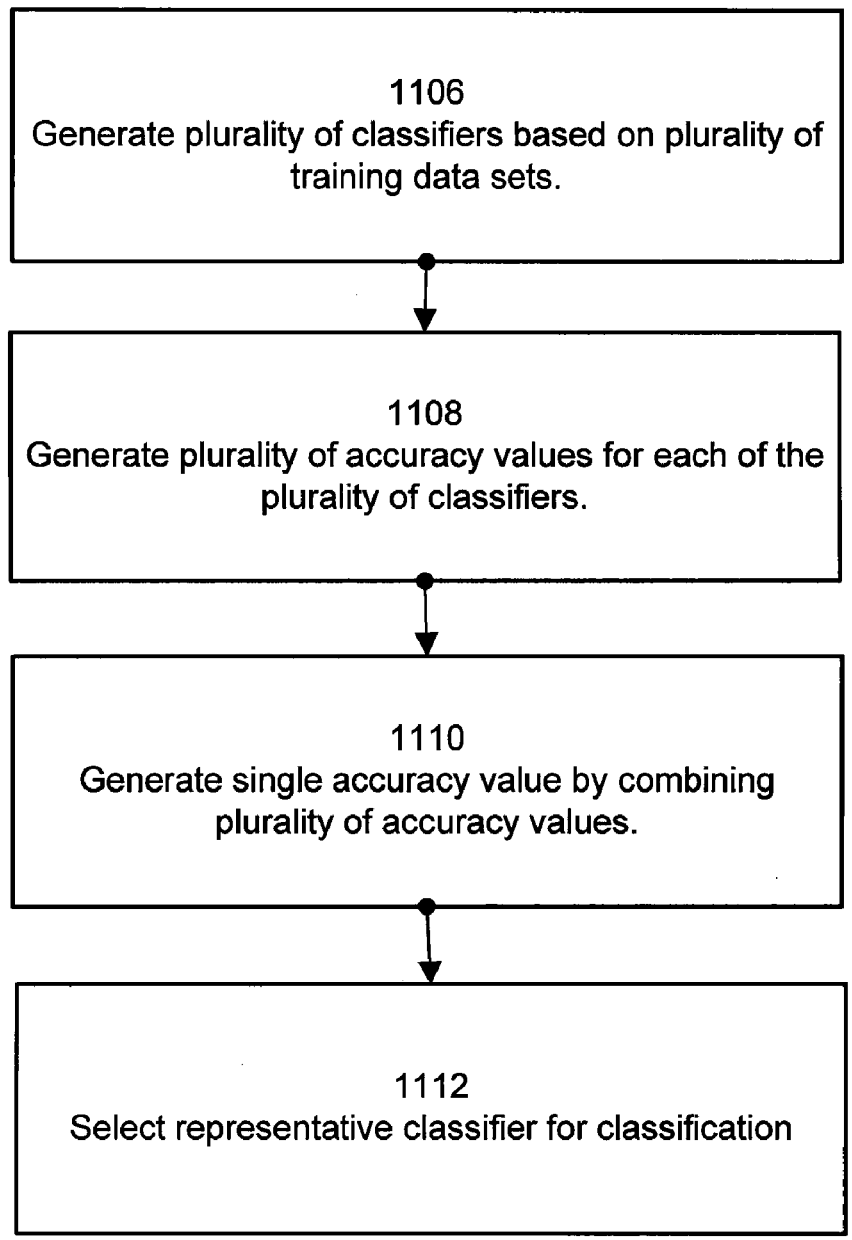
FIG. 11 illustrates a high-level workflow for the generation and validation of a plurality of classifiers.

Graph based sampling provides a mechanism to select different training sets with approximately an independent identical distribution in order to evaluate the accuracy of the classifier. FIG. 11 illustrates a high level workflow for the generation and validation 906 of a plurality of classifiers.

In the embodiment illustrated, the Classifier Validation Module 300 generates a plurality of classifiers based on the plurality of training subsets of real-world events 1106. Each classifier of the plurality of classifiers is generated using one training subset of real-world events for each defined class 1106.

The Classifier Validation Module 330 generates 1108 accuracy values to validate the performance of a classifier. For each training set, a test data set is composed of the subset of real-world events for each defined class that are not in the training set. The Classifier Validation Module 330 generates 1108 accuracy values based on classification results obtained by applying the classifiers generated based on training data to their respective training sets. Classification results include the number of false positive classifications of test set data, the number of false negative classifications of test set data, the percentage or accurate classifications. Other quantitative classification results representative of the accuracy of the classifier include common error metrics such as the mean average error (MAE) and root mean square error (RMSE).

The Classifier Validation Module 330 generates 1110 a single accuracy value based on combining the plurality of accuracy scores generated using each set of training and test data. The Classifier Validation module can combine the accuracy scores in any way to provide a single accuracy value representative of the performance of the classification model.

If the single accuracy value is greater than a given threshold value (e.g. greater than 90% accuracy) then one of the generated classifiers may be selected 1112 as a representative classifier for the classification model and data set. Generally, a classifier with a median accuracy value of the generated classifier is selected 1112 as a representative classifier for classification. Alternatively, the classifier with the highest accuracy value may be selected 1112 for use in classification.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a tangible computer readable storage medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A computer-implemented method of selecting a training data set from a plurality of sets of stored real-world event data for training at least one computer-implemented classifier, the training data set having a distribution approximating an independent identical distribution representative of a real-world distribution, the method comprising:
    selecting at least a first set of event data as the training data set;
    repeating, until a criteria for selecting the training data set is satisfied, the steps of:
    randomly selecting a first set of event data and a second set of event data;
    generating for the first and second sets of event data respective proximity values with respect to the training data set;
    selectively adding one of the first or second sets of event data to add to the training data set based on the respective proximity values; and
    storing the training data set for use in training the at least one classifier.

2. The method of claim 1, wherein the criteria for selecting the training data set is based on a size of the training data set.

3. The method of claim 1, wherein the criteria for selecting the training data set is based on a distribution of the training data set.

4. The method of claim 1, wherein the criteria for selecting the training data set is based on the respective proximity values.

5. The method of claim 1, wherein each set of event data represents a feature and the set of event data comprises a set of feature values of the feature associated with a plurality of real world events.

6. The method of claim 1, wherein each set of event data represents an event and the set of event data comprises a set of features associated with the event.

7. The method of claim 6, wherein each event is a graphic image comprising a set of pixels and the set of features associated with the graphic image are based at least in part on the set of pixels.

8. The method of claim 6, wherein each event is a document comprising a set of tokens and the set of features associated with the document are based at least in part on the set of tokens.

9. The method of claim 1, further comprising:
    selecting a plurality of training data sets;
    generating a consensus-based classifier, wherein the consensus-based classifier comprises a plurality of classifiers, each classifier based on a training data set of the plurality of training data sets; and
    storing the consensus-based classifier.

10. The method of claim 9, further comprising:
    selecting a plurality of training data sets; and
    generating a plurality of classifiers based on a classification model, wherein each classifier is based on a training data set of the plurality of training data sets.

11. The method of claim 10, further comprising:
    generating a plurality of classifications based on a test set of data, wherein each classification is based on a classifier of the plurality of classifiers
    determining a plurality of accuracy values, wherein each accuracy value is based on a classification of the plurality of classifications;
    generating a value representative of the accuracy of the classification model based on the plurality of accuracy values; and
    storing the value representative of the accuracy of the classification model.

12. The method of claim 1, further comprising:
    generating the proximity values based on a correlation function which determines a correlation of the first or second set of event data with respect to the training data set.

13. The method of claim 12, wherein the correlation function determines a value of correlation between sets of sequential data.

14. The method of claim 12, wherein the correlation function determines a value of correlation between sets of multi-dimensional data.

15. The method of claim 1, further comprising:
    generating the proximity values based on calculating the joint distribution of the set of data associated with the second or third set of event data and the sets of data associated with one or more sets of event data comprising the training data set.

16. A computer-implemented method of selecting a training set of video data from a plurality of sets of stored video data for training at least one computer-implemented video classifier, the training set of video data having a distribution approximating an independent identical distribution representative of a real-world distribution, the method comprising:
    selecting at least a first set of video data as the training set of video data;
    repeating, until a criteria for selecting the training set of video data is satisfied, the steps of:
    randomly selecting a first set of video data and a second set of video data;
    generating for the first and second sets of video data respective proximity values with respect to the training set of video data;
    selectively adding one of the first or second sets of video data to add to the training set of video data based on the respective proximity values; and storing the training data set of video data for use in training the at least one video classifier.

17. A computer-implemented, method of selecting a subset of correlated real-world event data, the method comprising:
selecting an initial subset of the real world event data as the training data set;
repeating, until a criteria for selecting the training data set is satisfied, the steps of:
randomly selecting first set of event data and second set of event data;
determining for the first and second sets of event data respective proximity values with respect to training data set;
selectively adding one of the first or second sets of event data to add to the training data set based on the respective proximity values; and
storing the training data set for use in training the at least one classifier.

18. A computer-readable storage medium on which is persistently encoded computer program code for selecting a training data set from a plurality of sets of stored real-world event data for training at least one computer-implemented classifier, the training data set having a distribution approximating an independent identical distribution representative of a real-world distribution, the computer program code comprising program code for:
selecting at least a first set of event data as the training data set;
repeating, until a criteria for selecting the training data set is satisfied, the steps of:
randomly selecting a first set of event data and a second set of event data;
generating for the first and second sets of event data respective proximity values with respect to the training data set;
selectively adding one of the first or second sets of event data to add to the training data set based on the respective proximity values; and
storing the training data set for use in training the at least one classifier.

19. The computer-readable storage medium of claim 18, wherein the criteria for selecting the training data set is based on a size of the training data set.

20. The computer-readable storage medium of claim 18, wherein the criteria for selecting the training data set is based on a distribution of the training data set.

21. The computer-readable storage medium of claim 18, wherein the criteria for selecting the training data set is based on the respective proximity values.

22. The computer-readable storage medium of claim 18, wherein each set of event data represents a feature and the set of event data comprises a set of feature values of the feature associated with a plurality of real world events.

23. The computer-readable storage medium of claim 18, wherein each set of event data represents an event and the set of event data comprises a set of features associated with the real world event.

24. The computer-readable storage medium of claim 23, wherein each event is a graphic image comprising a set of pixels and the set of features associated with the graphic image are based at least in part on the set of pixels.

25. The computer-readable storage medium of claim 23, wherein each event is a document comprising a set of tokens and the set of features associated with the document are based at least in part on the set of tokens.

26. The computer-readable storage medium of claim 18, further comprising program code for:
selecting a plurality of training data sets;
generating a consensus-based classifier, wherein the consensus-based classifier is comprises a plurality of classifiers, each classifier based on a training data set of the plurality of training data sets; and
storing the consensus-based classifier.

27. The computer-readable storage medium of claim 26, further comprising program code for:
selecting a plurality of training data sets; and
generating a plurality of classifiers based on a classification model, wherein each classifier is based on a training data set of the plurality of training data sets.

28. The computer-readable storage medium of claim 27, further comprising program code for:
generating a plurality of classifications based on a test set of data, wherein each classification is based on a classifier of the plurality of classifiers
determining a plurality of accuracy values, wherein each accuracy value is based on a classification of the plurality of classifications;
generating a value representative of the accuracy of the classification model based on the plurality of accuracy values; and
storing the value representative of the accuracy of the classification model.

29. The computer-readable storage medium of claim 18, further comprising program code for:
generating the proximity values based on a correlation function which determines a correlation of the first or second set of event data with respect to the training data set.

30. The computer-readable storage medium of claim 29, wherein the correlation function determines a value of correlation between sets of sequential data.

31. The computer-readable storage medium of claim 29, wherein the correlation function determines a value of correlation between sets of multi-dimensional data.

32. The computer-readable storage medium of claim 18, further comprising program code for:
generating the proximity values based on calculating the joint distribution of the set of data associated with the second or third set of event data and the sets of data associated with one or more sets of event data comprising the training data set.

33. A computer-readable storage medium on which is persistently encoded computer program code for selecting a training set of video data from a plurality of sets of stored video data for training at least one computer-implemented video classifier, the training set of video data having a distribution approximating an independent identical distribution representative of a real-world distribution, the method comprising:
selecting at least a first set of video data as the training set of video data;
repeating, until a criteria for selecting the training set of video data is satisfied, the steps of:
randomly selecting a first set of video data and a second set of video data;
generating for the first and second sets of video data respective proximity values with respect to the training set of video data;
selectively adding one of the first or second sets of video data to add to the training set of video data based on the respective proximity values; and
storing the training data set of video data for use in training the at least one video classifier.

34. A computer-readable medium on which is persistently encoded computer program code for selecting a subset of correlated real-world event data, the computer program code comprising program code for:
 selecting an initial subset of the real world event data as the training data set;
 repeating, until a criteria for selecting the training data set is satisfied, the steps of:
  randomly selecting first set of event data and second set of event data;
  determining for the first and second sets of event data respective proximity values with respect to the training data set;
  selectively adding one of the first or second sets of event data to add to the training data set based on the respective proximity values; and
 storing the training data set for use in training the at least one classifier.

35. A system for selecting a training data set for training at least one computer-implemented classifier, the system comprising:
 an event database comprising a plurality of stored event data sets; and
 a selection module in communication with the event database adapted to:
  select at least a first set of event data as the training data set;
  repeat, until a criteria for selecting the training data set is satisfied, the steps of:
   randomly selecting a first set of event data and a second set of event data;
   generating for the first and second sets of event data respective proximity values with respect to the training data set;
   selectively adding one of the first or second sets of event data to add to the training data set based on the respective proximity values; and
  storing the training data set for use in training the at least one classifier.

36. The system of claim 35, wherein the module is a feature set selection module, each set of event data represents a feature and the set of event data comprises a set of feature values of the feature associated with a plurality of real world events.

37. The computer-readable storage medium of claim 35, wherein the module is a training set selection module, each set of event data represents an event and the set of event data comprises a set of features associated with the real world event.

38. A system for selecting a training set of video data for training at least one computer-implemented video classifier, the system comprising:
 an video database comprising a plurality of stored video data sets; and
 a selection module in communication with the video database adapted to:
  select at least a first set of video data as the training set of video data;
  repeat, until a criteria for selecting the training set of video data is satisfied, the steps of:
   randomly selecting a first set of video data and a second set of video data;
   generating for the first and second sets of video data respective proximity values with respect to the training set of video data;
   selectively adding one of the first or second sets of video data to add to the training set of video data based on the respective proximity values; and
  storing the training set of video data for use in training the at least one video classifier.

* * * * *